Nov. 30, 1965					E. D. WILSON					3,220,459
ELECTRICALLY IGNITED GAS TORCH
Filed Jan. 8, 1962					5 Sheets-Sheet 1

INVENTOR.
EDWARD D. WILSON
BY
*Lyon+Lyon*
ATTORNEYS

Nov. 30, 1965   E. D. WILSON   3,220,459
ELECTRICALLY IGNITED GAS TORCH
Filed Jan. 8, 1962   5 Sheets-Sheet 2

INVENTOR.
EDWARD D. WILSON
BY Lyon+Lyon
ATTORNEYS

INVENTOR.
EDWARD D. WILSON
BY
*Lyon & Lyon*
ATTORNEYS

Nov. 30, 1965       E. D. WILSON       3,220,459
ELECTRICALLY IGNITED GAS TORCH
Filed Jan. 8, 1962       5 Sheets-Sheet 4

INVENTOR.
EDWARD D. WILSON
BY Lyon & Lyon
ATTORNEYS

United States Patent Office 3,220,459
Patented Nov. 30, 1965

3,220,459
ELECTRICALLY IGNITED GAS TORCH
Edward D. Wilson, Rte. 5, Box 350A, Salem, Oreg.
Filed Jan. 8, 1962, Ser. No. 164,808
18 Claims. (Cl. 158—27.4)

This invention relates to a gas torch having self-contained electrical apparatus for igniting the torch and, in particular, is directed to such an electrically ignited gas torch capable of using a mixture of gases, such as, but not limited to, oxygen and acetylene, which must be ignited externally of the torch to avoid possible internal explosion of the mixture.

There are various types of gas-consuming torches for performing such functions as brazing, soldering, localized heating, welding and metal burning or cutting. The type of function to be performed usually determines the torch to be used and the gas or mixture of gases to be consumed. For relatively low temperature soldering or brazing, a simple torch for using a single gas is usually adequate. The gas consumed in such a torch uses air from the surrounding atmosphere to support the combustion and although such torches of conventional designs are ignited by a match or striker externally of the torch, it has been found that a spark generated within the air-gas mixture before it is discharged from the torch will serve to ignite the gas without an explosion at the point of ignition. Such a torch and use of spark ignition is disclosed in my copending application entitled Electrically Ignited Gas Torch, Serial No. 84,690, filed January 24, 1961, now patent No. 3,155,140.

It is common to use a mixture of oxygen and acetylene in gas torches for obtaining relatively high temperatures for such functions as welding and metal burning or cutting. This process, commonly known as "oxyacetylene" welding or cutting, uses a torch which contains appropriate valving so that the oxygen and acetylene are mixed within the torch and discharged at the tip as a mixture. In lighting this torch, it is the common and accepted practice to first turn on the acetylene, to strike a spark or flame near the tip to ignite the pure acetylene and then to turn on the oxygen valve to obtain the proper oxygen-acetylene mixture for the flame desired to accomplish the heating or welding. If it is desired to cut the metal a valve is provided in the torch for emitting a blast of oxygen at the tip to cause rapid oxidation of the metal heated by the oxyacetylene flame thereby accomplishing the cutting. This blast of oxygen is usually emitted through an outlet in the center of the tip.

It is a common experience that it is relatively difficult to ignite the mixture of oxygen and acetylene, usually one to one, without a substantial flame to cause the ignition. For example, it has been found that the striker commonly used to ignite the pure acetylene flame is often inadequate to cause the ignition of the oxygen-acetylene mixture, particularly if the proportion of oxygen is relatively high or if the rate of flow of the mixture is relatively high.

It is extremely hazardous to attempt to ignite the oxygen-acetylene mixture while the same is still confined within the torch since the combustion is so rapid that an explosion is likely to result. The extent of damage resulting would depend on the quantity of the mixture and the proximity of an opening to the atmosphere for the expansion of the ignited gases. It has been found that even under the best conditions, it is impractical and dangerous to ignite the oxygen-acetylene mixture internally of the torch as is accomplished by my electrically ignited gas torch for using a single gas for soldering or low temperature brazing.

For a hand torch to be practical and useful, it must be relatively light and small in size. The torch must also be rugged in construction to withstand the shocks and abuse which are commonly encountered by any hand tool.

Accordingly, the principal object of this invention is to provide a novel form of gas-consuming torch which is electrically ignited and the normal stream of gas consumed by the torch is ignited externally of the torch.

Another object of this invention is to provide a novel form of gas torch wherein a charge of gas is electrically ignited and discharged adjacent the gas-emitting tip of the torch for igniting the main stream of gas to be used by the torch.

A further object of this invention is to provide a novel form of electrically ignited torch wherein the charge of ignited gas which serves to ignite the main stream of gas is emitted and electrically ignited by a single, manual manipulation of a trigger which also serves to emit the main stream of gas used by the torch.

A further and more detailed object of this invention is to provide a novel form of apparatus in an electrically ignited torch for emitting a charge of gas to an ignition chamber and electrically igniting that charge of gas while passing through the ignition chamber.

A further object of this invention is to provide a novel form of gas torch capable of using a mixture of two gases supplied separately to the torch wherein apparatus is provided for emitting and mixtng these two gases, separately emitting a charge of one of the gases, electrically igniting that charge of gas and directing the charge of ignited gas into the stream of mixed gases to ignite the mixture.

Other and more detailed objects and advantages of this invention will appear from the following description and the accompanying drawings.

Referring now to the drawings, the body, generally designated 10, of the torch is provided with a pair of valved fittings 11 and 12 for connection to the source of pressurized gases. For clarity of description, it will be assumed that the torch shown in the figures is to be used with oxygen and acetylene gases for oxyacetylene welding or oxyacetylene torch cutting, although it is to be understood that any two gases could be used which when mixed are combustible and one of such gases being combustible when mixed with air as is acetylene. Further, it is to be understood that by a mere duplication of certain of the valves and tubings hereinafter described, a mixture of more than two gases could be used by the torch.

The valved fittings 11 and 12 may be of a standard type used on oxyacetylene torches and each is capable of both shutting off the supply of gas completely and adjusting the rate of flow of the gas. These adjustments are made by turning the knobs 13 of the valves as desired. In accordance with the foregoing paragraph, it will be assumed that the oxygen supply is connected to valve fitting 11 and the acetylene supply is connected to valve fitting 12.

In order to provide the various passages and valving for controlling the flow of the gases as well as supporting the electrical apparatus for causing the ignition, the body 10 may be comprised of members 14, 15 and 16, housing 17, and tubings 18, 19 and 20 supporting the dispensing tip assembly generally designated 21. Each of the members 14, 15 and 16 may be a casting or solid block of material provided with the appropriate porting and connected one to the other by various tubings as hereinafter described and partially enclosed and joined to each other by the housing 17. The housing 17 is preferably made of an electrically insulating material such as plastic or fiber-glass. As shown in the drawings, the members 14, 15 and 16 and the housing 17 may all be a substantially square cross-section but this is not essential to my invention.

The member 14 is provided with appropriate porting so that tube 22 communicates with fitting 11 and tube 23 communicates with fitting 12. These tubes 22 and 23 extend between and are connected to members 14 and 15. The tubes 22 and 23 serve to supply oxygen and acetylene, respectively, to the member 15 where the flow of these gases is controlled by appropriate valving and porting as hereinafter described.

Figure 13:
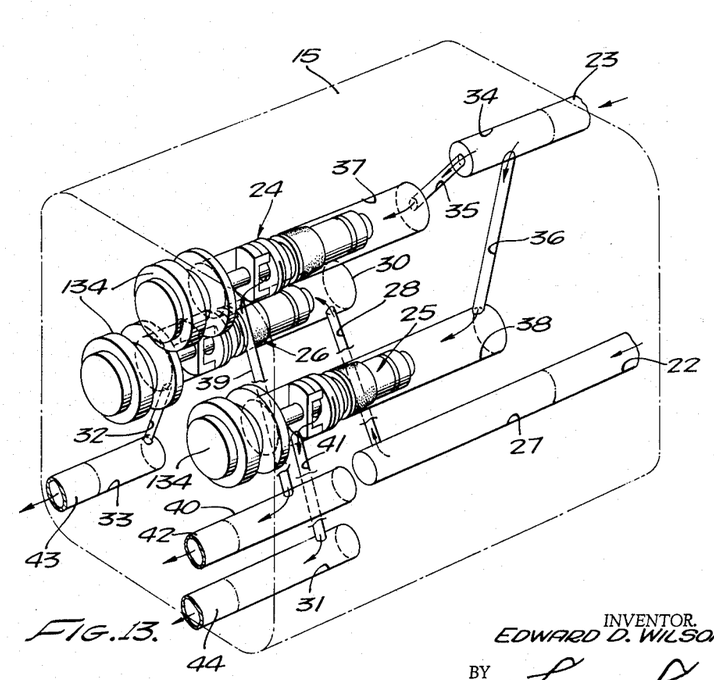
FIGURE 13 is a semidiagrammatic perspective view of that portion of the device containing the porting and the valves controlled by the trigger mechanism.

In order to control the flow of oxygen and acetylene as desired, the member 15 may be provided with three Schrader-type valves 24, 25 and 26 as best shown in FIGURE 13. The oxygen tube 22 communicates with a header port 27 in member 15 which in turn is provided with a passage 28 communicating with a bore 30. Bore 30 contains Schrader valve 26 which when opened permits oxygen to flow through passage 32 to header port 33. When valve 26 is closed oxygen is not allowed to pass from header port 27 to header port 33.

The acetylene tube 23 is attached to the member 15 and communicates with header port 34 provided in member 15. A pair of passages 35 and 36 extend from header port 34 to bores 37 and 38, respectively. Bores 37 and 38 are adapted to receive Schrader valves 24 and 25, respectively. When valves 24 and 25 are in a closed position, acetylene is not permitted to pass from header port 34 through the valves. When valve 24 is opened, acetylene passes from header port 34, through passage 35, through bore 37, through the valve and then through passage 39 to the bore 40. When valve 25 is opened, acetylene passes from header port 34 through passage 36, through bore 38, through valve 25 and then through passage 41 to bore 31.

Tubes 42, 43 and 44 extend from member 15 to member 16. Tube 42 communicates with bore 40 for transmitting the acetylene emitted through passage 39 when valve 24 is opened. Tube 43 communicates with bore 33 for transmitting oxygen to member 16. The tube 44 communicates with bore 31 for transmitting acetylene emitted by valve 25 to member 16. Tubes 43 and 44 always contain flowing oxygen and acetylene, respectively, at the same time since, as hereinafter described, valves 25 and 26 are always opened simultaneously and neither is ever opened individually.

A bore 45 is provided in member 16 and communicates with tube 42 for transmitting the acetylene through member 16 to sleeve fitting 46. A second bore 29 is provided in member 16 and passes therethrough communicating tube 44 with a bore 51a which in turn communicates with tube 19 to transmit the acetylene from tube 44 to tube 19. The tube 43 is connected to passage 47 in member 16 which in turn communicates with bore 48 containing Schrader valve 49 which is operated as hereinafter described. When Schrader valve 49 is opened, oxygen passes from bore 48 to passage 50 leading to tube 18 which transmits oxygen to the dispensing tip for the cutting operation when desired.

The tube 43 also communicates with a passage 51 in member 16 for transmitting the oxygen to be used in the oxygen-acetylene mixture used in the torch. A needle valve assembly 52 is mounted in the member 16 and is associated with passage 51 for permitting manual adjustment, by turning knob 53, of the rate of flow of oxygen through passage 51. The oxygen which is permitted to flow in passage 51 past the needle valve 52 mixes with the acetylene flowing from passage 29 in portion 51a of passage 51 and the mixture then flows through tube 19 to dispensing tip assembly 21.

Figure 1:
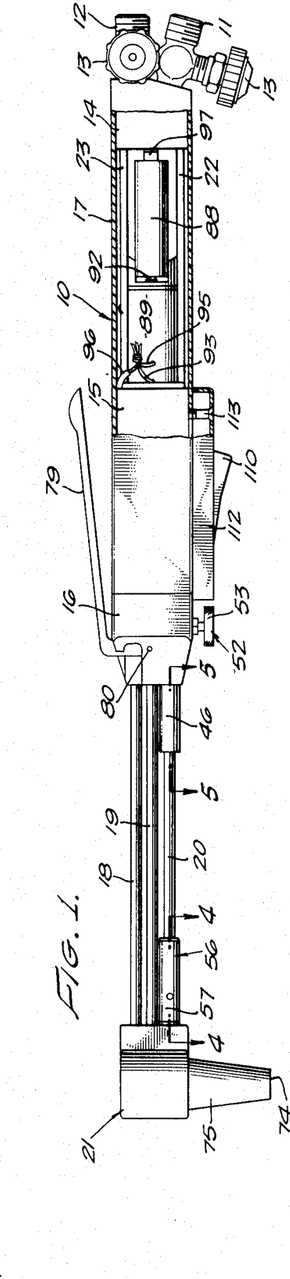
FIGURE 1 is an elevational view of the device with a portion shown in cross-section for clarity.
Figures 2, 3, 4, 5:
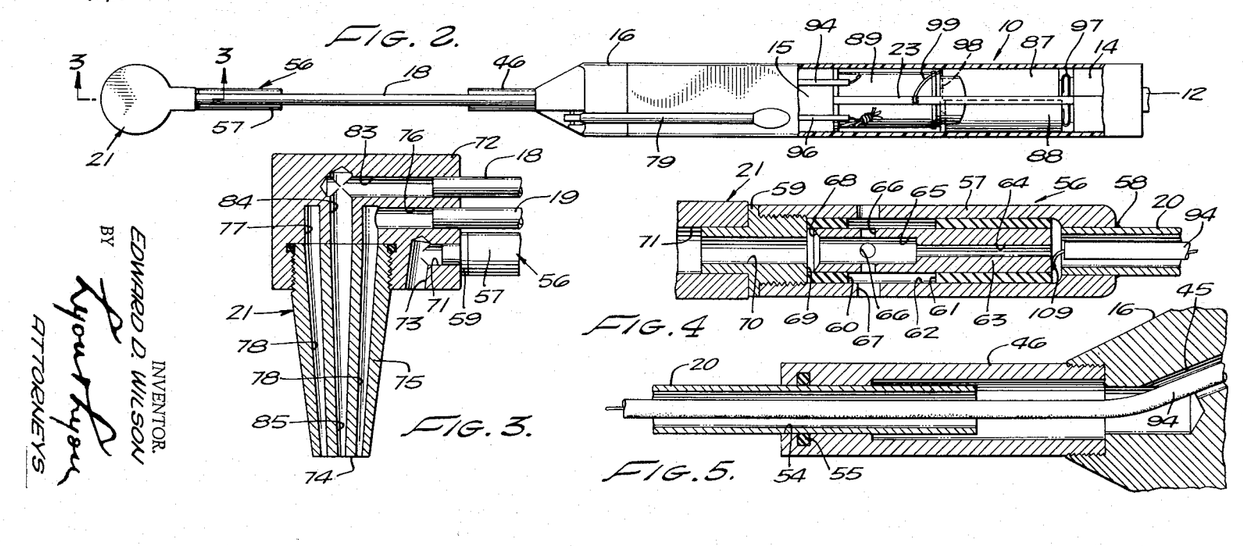
FIGURE 2 is a plan view of the device with a portion shown in cross-section for clarity.
FIGURE 3 is a sectional elevation view taken substantially on the line 3—3 as shown in FIGURE 2.
FIGURE 4 is a sectional plan view taken substantially on the line 4—4 as shown in FIGURE 1.
FIGURE 5 is a sectional plan view taken substantially on the line 5—5 as shown in FIGURE 1.

The sleeve fitting 46 is threadedly connected to the member 16 and has an internal bore 54 adapted to receive the tube 20. An O-ring and groove 55 are provided in the bore 54 for effecting a seal between sleeve 46 and the exterior of tube 20. Tube 20 is connected to an ignition chamber assembly, generally designated 56, which is in turn connected to the dispensing tip assembly 21 as best shown in FIGURE 4. The ignition chamber assembly 56 may be comprised of an outer sleeve 57 secured to the tube 20 by any convenient means such as solder 58, a fitting 59 secured to the dispensing tip assembly 21 and threadedly connected to the sleeve 57, a pair of insulating sleeves 60 and 61 fitting the internal bore 62 of sleeve 57 and in turn supporting an inner sleeve 63. Thus the ignition chamber assembly 56 may be disassembled by unthreading outer sleeve 57 from fitting 59 with the tube 20 being permitted to turn relative to sleeve fitting 46 since the only connection therewith is by the O-ring 55 contact on the exterior surface of the tube.

The acetylene emitted by Schrader valve 24 passes through the appropriate passages to tube 20 and then to ignition chamber assembly 56. The aceylene passes through the restricted bore 64 in the inner sleeve 63 to the enlarged bore 65 in that sleeve, and passes openings 66 in sleeve 63 with sufficient velocity to draw air through openings 67 in sleeve 57 and openings 66 so as to support the combustion of the acetylene gas when ignited as hereinafter described. This ignition is accomplished by a spark between the bevelled edge 68 of sleeve 63 and the end 69 of fitting 59. The ignited acetylene-air mixture passes through bore 70 in fitting 59 to bore 71 in the head 72 of the dispensing tip assembly 21 and then out through outlet 73. Outlet 73 is so positioned as to direct the ignited mixture toward the outlet end 74 of the dispensing tip 75 portion of the dispensing tip assembly 21.

The oxygen-acetylene mixture passing through tube 19 when Schrader valves 25 and 26 are opened enters the bore 76 in head 72 and from there passes into the annular groove 77 which communicates with a plurality of annularly positioned and spaced passageways 78 in the dispensing tip 75 for directing the oxygen-acetylene mixture out the outlet end 74 in substantially an annular pattern. The oxygen-acetylene mixture so dispensed is ignited by the charge of ignited acetylene gas passing from outlet 73 downward past outlet end 74 into the oxygen-acetylene stream. It has been found satisfactory in igniting the oxygen-acetylene mixture to emit a charge of ignited acetylene-air mixture from outlet 73 rather than using a continuous stream of burning acetylene-air mixture and this charge of acetylene-air mixture is accomplished by momentarily opening valve 24 and properly synchronizing the ignition spark to ignite the charge of gas as hereinafter described.

In order to accomplish torch burning or cutting of metal, a conventional oxyacetylene torch is provided with valving so that a charge of oxygen can be introduced into the already burning oxygen-acetylene flame thereby rapidly oxidizing the heated metal for cutting. The torch of this invention is also provided with appropriate apparatus for accomplishing oxyacetylene cutting, and as shown in the drawings, this apparatus may include a lever 79 pivotally mounted on pin 80 which is secured to member 16 so that upon depression of lever 79, the pin 81 mounted in rubber grommet 82 engages the stem of Schrader valve 49 to open that valve and allow oxygen to pass from bore 48 to tube 18 as heretofore described. Tube 18 is connected to head 72 and communicates with bores 83 and 84 which in turn communicate with a central bore 85 in dispensing tip 75 so that oxygen passing through tube 18 passes out through the center of the outlet end 74 to accomplish the burning.

The dispensing tip 75, as shown in the drawings, is of a relatively conventional design and is removable by unthreading from head 72. Various other conventional dispensing tips commonly known as "cutting tips," "welding tips" or "brazing tips" may be substituted for the dispensing tip 75 illustrated for accomplishing the particular function desired.

Figure 7:
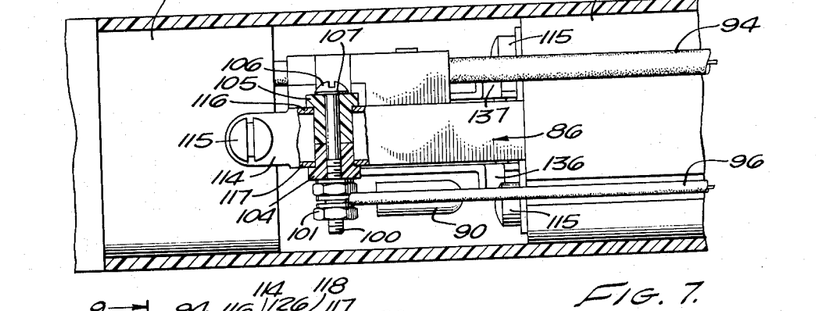
FIGURE 7 is a sectional plan view taken substantially on the line 7—7 as shown in FIGURE 6 and illustrating that portion of the device shown in FIGURE 6.

In order to cause the ignition spark between the bevelled edge 68 and the end 69 in the ignition chamber assembly 56, electrical means are provided and may be actuated by the trigger mechanism assembly, generally designated 86. As shown in the drawings the electrical means may include a pair of batteries 87 and 88, a coil 89, a condenser 90, a pair of contact points, generally designated 91, and appropriate wiring for causing a spark in the ignition chamber 56 upon momentary closing of contact points 91, as hereinafter described in reference to the operation of the trigger mechanism assembly 86. The coil 89 is of a conventional type having primary and secondary windings for increasing the voltage in a direct current system in order to effect a spark at a desired spark gap between edge 68 and end 69. One end of the primary winding in the coil 89 is fixed to the battery contact point 92 and the other end of the primary winding is wire 93. One end of the secondary winding is connected to wire 94 and the other end of the secondary winding is represented as wire 95 which is in turn connected to wire 93 and lead wire 96. The batteries 87 and 88 are electrically joined in series by means of spring contact clip 97 engaging the positive end of one battery and the negative end of the other battery. In order to complete the electrical circuit, the battery contact point 98 is grounded to the body of the torch by means of jumper wire 99 which leads from contact point 98 to tube 23. The various tubes (18, 19, 20, 22, 23, 42, 43 and 44) and the members 15 and 16 are of electrically conductive material so that only a single insulated wire need be used to complete an electrical circuit at any point in the torch as is commonly known. Wire 96 which is joined to one side of the primary winding as well as one side of the secondary winding of the coil 89 leads to and is mounted on the threaded post 100 by means of nut 101. The wafer type condenser 90 has one lead 102 also secured to post 100 and the other lead 103 connected to tube 43 for grounding that side of the condenser to the body of the torch. As best shown in FIGURE 7, the threaded post 100 extends through the trigger mechanism assembly 86 and is insulated therefrom by insulating grommets 104 and 105. On the head 106 of post 100 is fixed an angle bracket 107 which carries the upper contact point 108 of the contact points 91. The lower contact point 145 of contact points 91 is grounded to the body of the torch by the manner of mounting so that closing of the contact points 91 completes the electrical circuit to cause a current through the primary winding of the coil 89 from the batteries 87 and 88 which thereby induces a current in the secondary winding of the coil 89 to charge the condenser 90. As the contact points 91 open, the condenser 90 is discharged through wire 94 by a spark across the gap between bevelled edge 68 and end 69.

Figures 9, 10, 11:
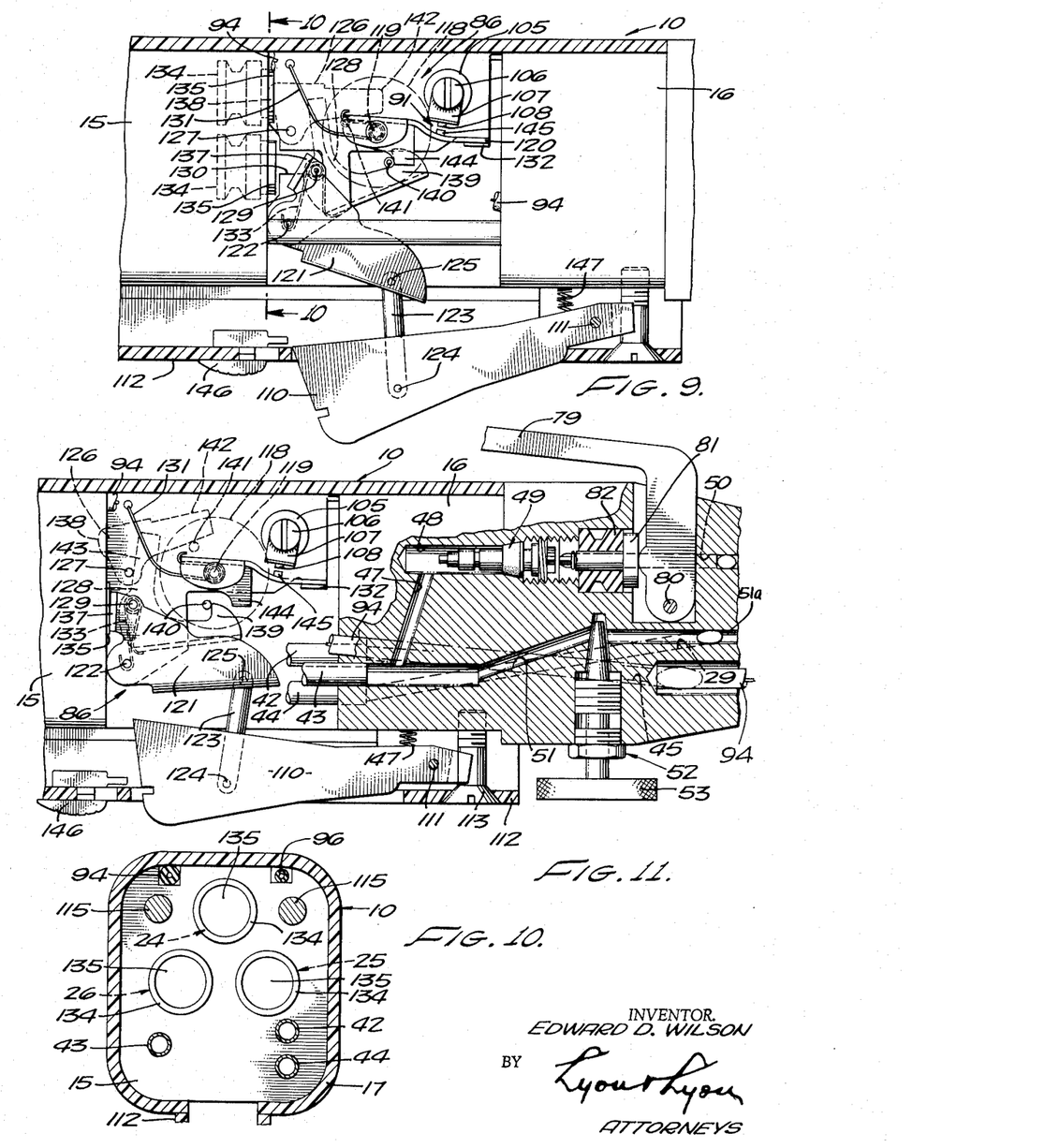
FIGURE 9 is a sectional elevation view taken substantially on the line 9—9 as shown in FIGURE 8, and illustrating the trigger mechanism in a normal or non-actuated position.
FIGURE 10 is a lateral sectional view of the device taken substantially on the line 10—10 as shown in FIGURE 9.
FIGURE 11 is a sectional elevation view similar to FIGURE 9 and illustrates the trigger mechanism in an intermediate position of actuation.
Figure 12:
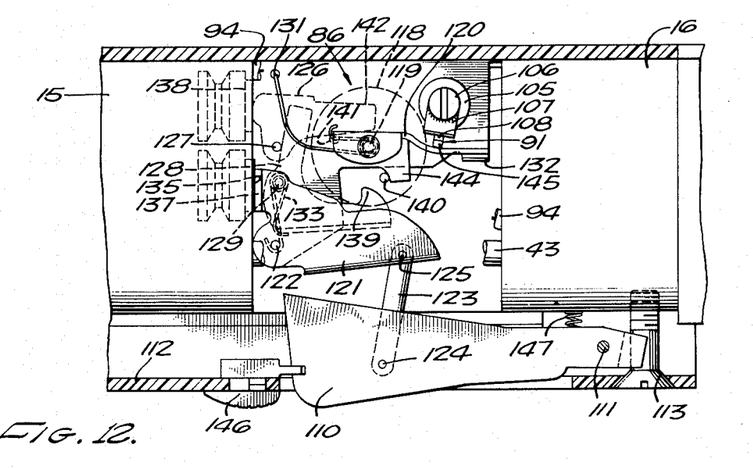
FIGURE 12 is a sectional elevation view similar to FIGURE 9 and illustrates the trigger mechanism in a fully actuated position.

In FIGURES 9, 11 and 12 the insulated wire 94 is broken away for clarity of illustration of the trigger mechanism assembly 86, but in actuality is continuous between the point adjacent member 15 to the point adjacent member 16 where the wire is illustrated as fragmentary ends. The wire 94 leads into the bore 45 in member 16 and thence through fitting 46 and tube 20 to the ignition chamber assembly 56 where it is secured to the inner sleeve 63 by any convenient means such as solder 109. The inner sleeve 63 is insulated from tube 20 and outer sleeve 57 by the insulating sleeves 60 and 61 as heretofore described so that the electrical potential or voltage between the wire 94 and the body of the torch upon opening of the momentarily closed contact points 91, as hereinafter described, will cause a spark between the bevelled edge 68 of sleeve 63 and the end 69 of fitting 70 to ignite the charge of acetylene-air mixture present in the ignition chamber assembly.

With the batteries 87 and 88, coil 89, condenser 90 and the various wires connected as heretofore described, an electrical potential or charge is created in the condenser 90 upon the momentary closing of the contact points 91 which is discharged by the spark described upon the opening of the normally opened contact points 91. Although for my preferred form illustrated in FIGURES 1 through 13, I have shown batteries, coil, condenser and contact points appropriately wired for generating a spark at the spark gap in the ignition chamber 56, it is to be understood that any combination of electrical apparatus may be used, such as but not limited to my modified form shown in FIGURES 14, 15 and 16, which will develop the desired spark at the appropriate time as controlled by a trigger mechanism such as assembly 86. The electrical apparatus of both my preferred and modified forms as shown are only two relatively compact and self-contained assemblies for creating the spark as desired upon operation of a trigger mechanism assembly. It is to be noted that condenser 90 has been omitted from the sectional view, FIGURE 8, for clarity of illustration of the trigger mechanism assembly 86.

Means are provided for momentarily opening valve 24 to emit a charge of acetylene gas, for opening valves 25 and 26 to emit oxygen and acetylene, and for momentarily closing contact points 91 to cause the spark for igniting the charge of acetylene gas, and as shown in the drawings, these means may be comprised of the trigger mechanism assembly 86. FIGURE 9 illustrates the trigger mechanism in its unoperated or normal position. A trigger 110 is provided and pivotally mounted by pin 111 which is secured to the trigger housing 112 mounted on the exterior of the housing 17 by any convenient means such as screws 113. As the trigger 110 is depressed inwardly toward the housing, the various parts of the trigger mechanism assembly 86 assume the intermediate positions shown in FIGURE 11 and upon further depression of trigger 110 the various parts assume the positions shown in FIGURE 12.

A frame 114 is provided for mounting the various components of the trigger mechanism assembly and is itself mounted to members 15 and 16 by screws 115. The frame 114 has two side walls 116 and 117 which are substantially parallel and spaced as best shown in FIGURE 7.

Figure 8:
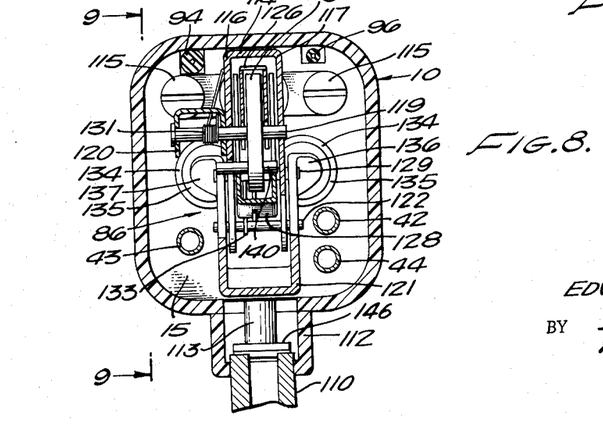
FIGURE 8 is a lateral sectional view of the device taken substantially on the line 8—8 as shown in FIGURE 6.

A wheel 118 is pivotally mounted between side walls 116 and 117 by means of a pin 119 passing through the wheel and both side walls. Pin 119 extends beyond side wall 116 for pivotally supporting contact lever 120. A channel-shaped lever 121 is pivotally supported on the frame 114 by means of pin 122 which extends through both side walls 116 and 117 and the side walls of the channel-shaped member 121 which fit over the outside of side walls 116 and 117 as best shown in FIGURE 8. An extension rod 123 extends between trigger 110 and lever 121 and is secured to each by means of pins 124 and 125, respectively.

A trip lever 126 is pivotally mounted between the side walls of the frame 114 by means of pin 127 which extends through the trip lever and the side walls 116 and 117. A pawl 128 is pivotally mounted on the lever 121 by means of pin 129 which passes through the pawl and the side walls of the lever 121. The pawl 128 is channel-shaped and as best shown in FIGURE 8 is mounted between the side walls 116 and 117 of frame 114. Relieved portions 130 in each of the side walls 116 and 117 are provided for permitting movement of the pin 129 as the lever 121 is pivoted about pin 122.

A torsion spring 131 is provided for urging contact lever 120 in clockwise direction as viewed in FIGURES 9, 11 and 12 in order to maintain the contact points 91 in a normally open position. A stop 132 is provided on side wall 116 and extends below the end of contact lever 120 to limit the clockwise movement of the lever as urged by the torsion spring 131. Another torsion spring 133 is provided for urging the pawl 128 in a counterclockwise direction relative to lever 121 as viewed in FIGURES 9, 11 and 12. The torsion spring 133 engages only pin 122, pin 129 and pawl 128 so that the movement of pawl 128 relative to the frame 114 is not restricted.

Figure 6:
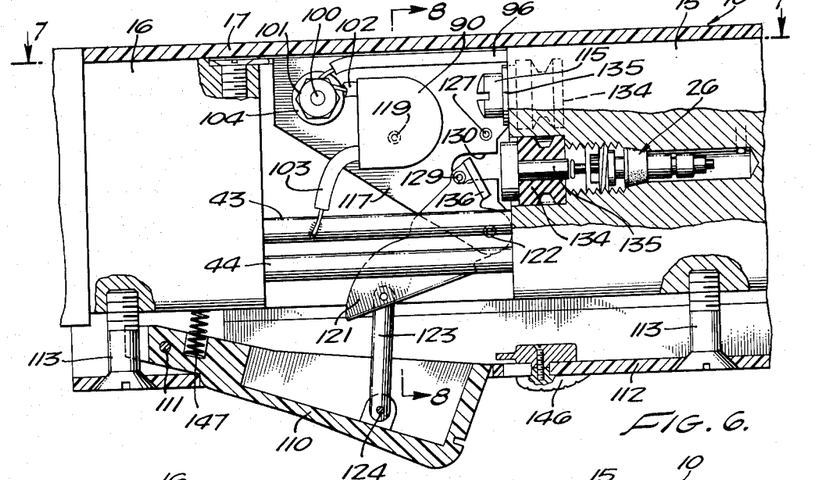
FIGURE 6 is a fragmentary sectional elevation view of the portion of the device containing the trigger mechanism.

Each of the Schrader valves 24, 25 and 26 has a rubber grommet 134 and a pin 135 associated therewith as shown in FIGURE 6 for Schrader valve 26. Upon movement of the pin 135 toward the Schrader valve, the pin engages the stem of the valve to open the valve and upon releasing the pin 135 the resiliency in the grommet 134 causes the pin to be retracted from the stem of the Schrader valve to allow the valve to close. The lever 121 is provided with a pair of ears 136 and 137 for engaging the pins 135 associated with the Schrader valves 25 and 26, respectively, for opening same. The trip lever 126 is provided with a nose portion 138 for engaging the pin 135 associated with Schrader valve 24 for operating that valve.

The pawl 128 is provided with a hook portion 139 for engaging a pin 140 mounted in the wheel 118. A second pin 141 is mounted in the wheel 118 and engages an extension arm portion 142 of the trip lever 126. In the normal or unoperated position of the trigger mechanism, as shown in FIGURE 9, the trip lever 126 contacts the pin 135 associated with Schrader valve 24 but does not depress the pin so as to open the valve. The extension arm portion 142 of the trip lever 126 engages the pin 141. The hook portion 139 of pawl 128 engages the pin 140 on the wheel 118 and the engagement therewith is maintained by the torsion spring 133 urging the pawl in a counterclockwise direction as heretofore described. The ears 136 and 137 of the lever 121 do not engage the pin 135 associated with Schrader valves 25 and 26 and therefore those valves are in a closed position. Further it will be noted that the contact points 91 are in an open position due to the urging of the contact lever 120 in a clockwise or open direction by the torsion spring 131.

As the trigger 110 is depressed, the extension rod 123 causes the lever 121 to turn in a counterclockwise direction about pin 122. This causes pawl 128 to move to the left (as viewed in FIGURES 9, 11 and 12) by virture of its attachment to lever 121 by pin 129. The leftward movement of pawl 128 causes clockwise rotation of the wheel 118 due to the engagement of the hook portion 139 of pawl 128 with the pin 140 on the wheel 118. By virtue of the rotation of wheel 118 the pin 141 thereon moves the extension arm portion 142 of trip lever 126 upward thereby causing trip lever 126 to turn in a counterclockwise direction about its pivot pin 127, thereby causing the nose portion 138 to engage the pin 135 associated with Schrader valve 24 to cause opening of that valve to allow the acetylene to pass into passage 39 and thence to ignition chamber assembly 56 as heretofore described. Further depression of the trigger 110 causes additional counterclockwise turning of lever 121 and additional leftward movement of pawl 128. Also, the ears 136 and 137 of lever 121 engage the pins 135 associated with valves 25 and 26, respectively, to open those valves and allow acetylene and oxygen, respectively, to pass into bores 31 and 33, respectively, and thence to the dispensing tip assembly 21 as heretofore described. The additional leftward movement of pawl 128 causes the extension arm portion 143 of the pawl to engage pin 127 thereby causing clockwise rotation of the pawl relative to the frame 114 and wheel 118. This clockwise rotation of pawl 128 results in downward movement of the hook portion 139 thereby releasing pin 140. Since the rubber grommet 134 associated with valve 24 urges the trip lever 126 in a clockwise direction, the engagement of the extension arm portion 142 with the pin 141 urges the wheel 118 to rotate in a counterclockwise direction to return to its normal position after the hook portion 139 is released from the pin 140. The inertia of wheel 118 causes the pin 140 to strike the extension arm portion 144 of the contact lever 120 thereby urging the contact lever to turn in a counterclockwise direction moving contact point 145 into engagement with contact point 108, as best shown in FIGURE 12, to close the electrical circuit. The torsion spring 131 immediately returns the contact lever 120 to its normal or open position thereby resulting in the momentary closing of the contact points 91 which is desired. The counterclockwise rotation of wheel 118 back to its normal position also releases the trip lever 126 so that the Schrader vlave 24 is closed to prevent further emission of acetylene gas therethrough until complete reactuation of the trigger 110. If the trigger 110 is held in a depressed position the ears 136 and 137 of the lever 121 continue to hold the Schrader valves 25 and 26 open through pins 135 to allow the welding or cutting as heretofore described.

A button 146 may be provided and mounted on the trigger housing 112 to lock the trigger 110 in a depressed position as shown in FIGURE 12. A compression spring 147 may be provided for urging the trigger 110 in a counterclockwise direction to return same to the normal or unoperated position illustrated in FIGURE 9.

When the trigger 110 is released after the operation heretofore described the torsion spring 133 urges the pawl 128 in a counterclockwise direction so that the hook portion 139 again engages pin 140 as shown in FIGURE 9. Thus it may be seen that by depressing the trigger 110 a charge of acetylene gas is allowed to pass through valve 24 and into the ignition chamber assembly 56 where the spark from bevelled edge 68 to end 69 caused by the closing and opening of contact points 91 causes ignition of the acetylene air mixture and the further passage of that ignited mixture out the outlet 73 to the outlet 74 of the tip 75 to ignite the oxygen-acetylene mixture released by valves 25 and 26 which are also opened by the depression of the trigger 110.

Figure 14:
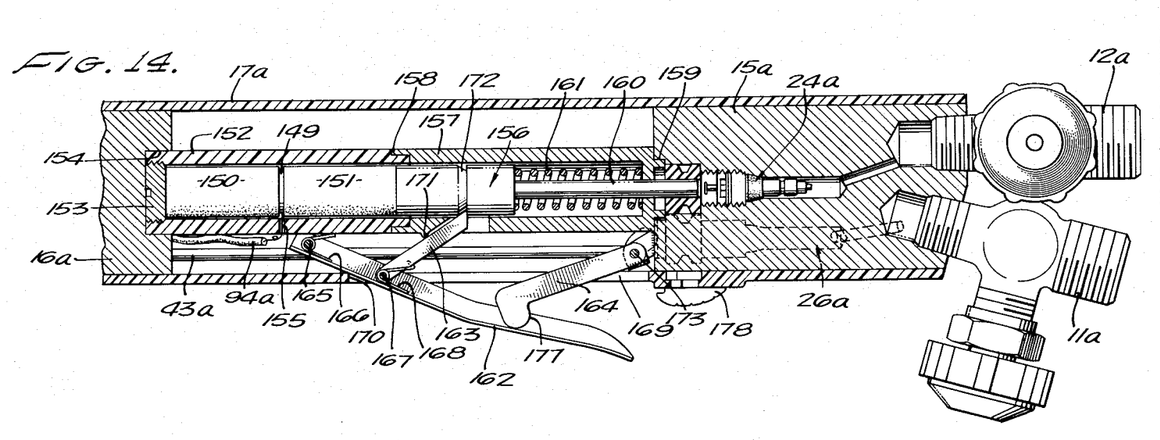
FIGURE 14 is a longitudinal sectional elevation view similar to FIGURE 6 and showing a modified form of the spark-generating apparatus and trigger mechanism of my device.
Figure 15:
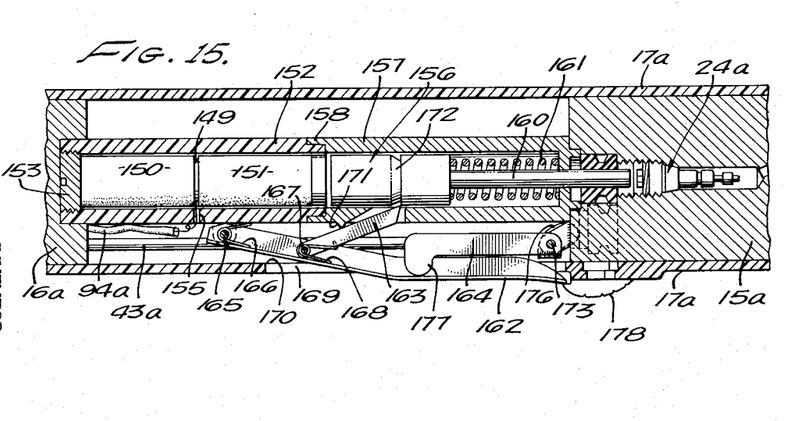
FIGURE 15 is a longitudinal sectional elevation of the the modification shown in FIGURE 14 and illustrating the trigger mechanism thereof in a nearly completely actuated condition.
Figure 16:
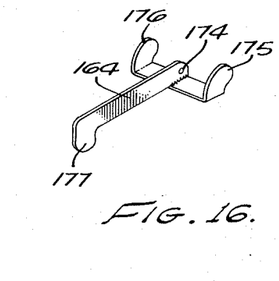
FIGURE 16 is a perspective view of one of the levers incorporated in the modified form of my device illustrated in FIGURES 14 and 15.

In the modified form of my invention shown in FIGURES 14, 15 and 16, the electrical apparatus used for generating the electrical current to cause the ignition spark and the trigger mechanism for actuating such electrical apparatus are modified from my preferred form although each performs substantially the same function as in my preferred form. As will hereinafter be pointed out, the valving, porting, tubing, supporting members, and operation are substantially the same in my modified form, although somewhat simplified, as described in my preferred form.

In my modified form, valve fittings 11a and 12a are the same as valve fittings 11 and 12 in my preferred form in that they are each adapted to be connected to a supply hose containing oxygen and acetylene, respectively, and are each capable of both shutting off the supply of gas completely and adjusting the rate of flow of the gas. Valve fittings 11a and 12a are connected to member 15a which is similar to member 15 of my preferred form in that member 15a contains the Schrader-type valves for starting and stopping the flow of gases in operating the torch. It will be noted that there are no parts in my modified form which are similar to member 14 and tubes 22 and 23 of my preferred form since the space for batteries (like 87 and 88) and a coil (like 89) is not needed in my modified form.

A member 16a is provided in my modified form which may be substantially identical to member 16 of my preferred form with regard to all porting, valving, passages and connections with tubes. The remainder of my modified form, forward of member 16a, is provided with tubes, dispensing tip assembly, ignition chamber assembly, etc., substantially identical to my preferred form.

Member 15a is provided with Schrader valves 24a, 25a (not shown) and 26a (shown by dashed lines in FIGURE 14) similar to valves 24, 25 and 26, respectively, of my preferred form, and which are similarly oriented. Passages and ports are provided in member 15a similar to those in member 15, as best shown in FIGURE 13, whereby opening of valve 24a supplies acetylene through tubes, etc. to the ignition chamber assembly 56, opening of valve 25a supplies acetylene through tubes, etc. to tube 19, and opening valve 26a supplies oxygen through tubes, etc. to tube 19. For example, notice tube 43a for transmitting oxygen emitted by valve 26a from member 15a to member 16a, which is identical to the function of tube 43 in my preferred form. Tubes similar to tubes 42 and 44 are provided also but are not shown in FIGURES 14 and 15 for clarity of illustration.

Means are provided for generating the electrical potential and current to cause the spark within the ignition chamber assembly 56 of my modified form and as shown in the drawings, these means may include a pair of piezoelectric crystal cells 150 and 151 slidably mounted in an insulating sleeve 152 and having a lead wire 94a attached to a disc 149 of conductive material positioned between the ends of cells 150 and 151.

Lead wire 94a is similar to wire 94 of my preferred form in that it passes through member 16a, into sleeve fitting 46, through tube 20 and is secured to inner sleeve 63 of the ignition chamber assembly 56. The lead wire 94a extends through an aperture 155 in the side of sleeve 152 in order to attach the disc 149. An end plug 153 closes the end of insulating sleeve 152 which is adjacent member 16a and that same end of sleeve 152 is mounted in a bore 154 in member 16a.

The crystal cells 150 and 151 are each piezoelectric crystals capable of producing a relatively high voltage potential when energized by mechanically squeezing or striking the crystal. For example, I have found that lead zirconate lead titanate ceramic crystals such as those available from the Clevite Electronic Components Company of Bedford, Ohio, under the trademark "Clevite PZT–4" are highly satisfactory for producing the necessary voltage. Although squeezing or striking a single crystal would be sufficient to produce the desired voltage, I prefer to use two crystal cells 150 and 151 positioned "back to back" with ends of like polarity adjacent so that the difficulty of insulating and conducting-off the electrical charge produced is minimized. Thus the remote ends of the cells 150 and 151 are grounded to the body of my device and the electrical potential produced at their adjacent ends exceeds "ground potential" so that the electrical charge is conducted through lead wire 94a to the ignition chamber 56.

While the piezoelectric crystals 150 and 151 may be energized by either squeezing or striking, I prefer to strike the crystals so that the electrical potential buildup is sufficiently fast as to not be dissipated within the crystals. If the crystals were squeezed too slowly the electrical potential would be dissipated as rapidly as it developed and thus no resultant potential would exist to produce the spark in the ignition chamber.

In order to urge crystal cell 151 against crystal cell 150 with sufficient force to generate the electrical charge in wire 94a to cause the desired spark, a plunger, generally designated 156, is slidably mounted in a sleeve 157 which is axially aligned and telescopically attached to insulated sleeve 152 at 158. The sleeve 156 is also axially aligned with valve 24a and has end 159 secured to member 15a. The plunger 156 has a stem portion 160 surrounded by a compression type coil spring 161 for sharply urging the plunger against cell 151 upon releasing the plunger after movement of the plunger within sleeve 157 from left to right as viewed in FIGURES 14 and 15, as hereinafter described. The stem portion 160 is adapted to engage the stem of valve 24a to open that valve upon movement of plunger 156 from the position shown in FIGURE 14 to the position shown in FIGURE 15.

Means are provided for actuating plunger 156 and for opening valves 25a and 26a and as shown in the drawings these means may include a trigger mechanism assembly of trigger 162, a trip lever 163 and a cam lever 164.

The trigger 162 is pivotally mounted on housing 17a by pivot pin 165 and a torsion spring 166 urges the trigger in a downward or clockwise direction, as viewed in FIGURES 14 and 15. Trigger 162 protrudes through slot 169 in the housing 17a and its clockwise turning is limited by engagement with edge 170 of the slot 169. The trip lever 163 is pivotally mounted on the trigger 162 by pin 167 and a torsion spring 168 urges the trip lever in a counterclockwise direction relative to trigger 162, as viewed in FIGURES 14 and 15. The counterclockwise turning of trip lever 163 is limited by engagement with the protuberance 171 on sleeve 157 and the annular groove 172 in plunger 156.

The cam lever 164, shown individually in FIGURE 16, is pivotally mounted on member 15a by pin 173 passing through hole 174 in the lever and is urged in a counter-clockwise direction, as viewed in FIGURES 14 and 15, by the resiliency of the rubber grommets (not numbered) associated with valves 25a and 26a similar to rubber grommets 134 and pins 135 provided with valves 24, 25 and 26 of my preferred form. The ears 175 and 176 of cam lever 164 are positioned to engage pins (not numbered) similar to pins 135 of my preferred form for opening valves 25a and 26a, respectively, upon clockwise turning of cam lever 164. The end 177 of lever 164 is adapted to engage the inner side of trigger 162.

FIGURE 14 illustrates the normal, unoperated positions of the various parts of my modified form of torch. For operating, the trigger 162 is depressed thereby turning in a counterclockwise direction. As pin 167 is raised the trip lever 163 is forced to turn in a clockwise direction and urges the plunger 156 toward the left, as viewed in FIGURES 14 and 15, to compress the spring 161 and open the valve 24a. The upward movement of trigger 162 also turns cam lever 164 in a clockwise direction to open valves 25a and 26a. As the trigger 162 is depressed slightly further than the position shown in FIGURE 15, the engagement of protuberance 171 with trip lever 163 causes the trip lever to come out of engagement with annular groove 172 thereby allowing the spring 161 to quickly urge the plunger 156 toward crystal cell 151. The stem portion 160 releases the stem of valve 24a thereby allowing that valve to close. The striking of crystal cell 151 by plunger 156 causes the spark across bevelled edge 68 and end 69, as heretofore described, for igniting the charge of acetylene gas emitted by valve 24a while that valve was held open by the stem portion 161 of the plunger. This ignited charge of acetylene-air mixture serves to ignite the mixture of oxygen and acetylene emitted by valves 26a and 25a, respectively, in the same manner as in my preferred form.

A lock button 178 may be slidably mounted on housing 17a for sliding into the position shown in FIGURE 15 to maintain the trigger 162 in a depressed position for continuous use of the torch after it has been ignited.

Releasing the trigger 162 allows the trigger, the trip lever 163 and the cam lever 164 to return to their positions shown in FIGURE 14, thereby permitting valves 25a and 26a to close and trip lever 163 to reengage the annular groove 172 of plunger 156 for subsequent operation.

While I have shown one apparatus for energizing the crystal cells 150 and 151 to create the current necessary to cause the ignition spark, it is to be understood that there are other methods of energizing these crystal cells which are readily apparent to those skilled in the art and may be used in my device without departing from my invention.

Although I have fully described my invention in terms of an oxyacetylene torch and in specific details as to the various operationg parts of both my preferred and modified forms, it is to be understood that I do not wish to be limited to a torch for use with oxygen and acetylene or to the details herein set forth and illustrated in the drawings, but my invention is of the full scope of the appended claims.

I claim:

1. In an electrically ignited gas torch for using an inflammable gas or mixture of at least two gases supplied separately to the torch under pressure, the combination of: a body having means for connecting to the supply of gases, a gas-dispensing tip mounted on said body, said body having a plurality of passageways for conducting the gases from said connecting means to said dispensing tip, a plurality of valves associated with said passageways for controlling the flow of gas through said passageways, a trigger movably mounted in said body, trip means associated with said trigger for momentarily opening one of said valves to emit a charge of one of the gases upon actuation of said trigger, one of said valves for each gas supplied for emitting the gases to one of said passageways leading to said tip for mixing the gases before dispensing from said tip, a pair of outlets in said dispensing tip, the first of said outlets for emitting the mixture of gases and the second outlet for emitting the charge of gas released by the valve associated with said trip means, electrical means for igniting that charge of gas within the passageway leading to said second outlet whereby the mixture of gases emitted from the first said outlet is ignited by the charge of ignited gas emitted from said second outlet, and means for operating said electrical means in synchronization with the said emission of a charge of gas for igniting said charge of gas passing through the said passageway leading to said second outlet.

2. The combination of claim 1 wherein the means for operating said electrical means in synchronization with emission of the charge of gas includes the said trigger and comprises a wheel rotatably mounted on said body, a lever pivotally mounted on said body, a rod extending between said trigger and said lever for causing pivotal movement of said lever upon turning of said trigger, a pawl pivotally mounted on said lever, a pair of pins mounted on said wheel, a trip lever pivotally mounted on said body, a contact lever pivotally mounted on said body and having a contact point for closing an electrical circuit to cause the gas igniting spark, means on said pawl for engaging one of said pins on said wheel to cause turning of said wheel in one direction upon pivotal movement of said lever caused by actuation of said trigger, the other of said pins engaging said trip lever for pivoting same, pivotal movement of said trip lever serving to open said valve means, means for engaging the said pawl upon complete actuation of said trigger for disengaging said pawl from the first said pin on said wheel, means for causing the said wheel to turn in a reverse direction after release by said pawl, the said contact lever being so positioned as to be engaged by and stop the said first pin upon the reverse direction rotation of the wheel, and the said engagement of the first pin with said contact lever causing pivotal movement of said contact lever and said contact point to momentarily close said electrical circuit.

3. The combination of claim 1 wherein said electrical means includes a pair of crystal cells for generating said spark when energized and means for energizing said crystal cells.

4. The combination of claim 1 wherein said electrical means includes a pair of crystal cells for generating the said spark when energized, and means for opening said valve means and for urging said pair of crystal cells together to energize said cells.

5. The combination of claim 1 wherein said electrical means includes a pair of adjacent crystal cells, a wire leading from between said cells to the said passageway for conducting the charge of gas for transmitting the current for causing the spark, and means for urging one of said crystal cells against the other to generate the current in said wire; said means for urging one crystal cell against the other including a plunger movable toward and away from said one crystal cell, biasing means urging said plunger toward said one crystal cell, and means for moving said plunger away from said one crystal cell and releasing said plunger for striking said one crystal cell in a direction toward the said other crystal cell to generate a current.

6. In an electrically ignited gas torch for using a mixture of at least two gases supplied separately to the torch under pressure, the combination of: a body having means for connecting to the supply of gases, a gas-dispensing tip mounted on said body, said body having a plurality of passageways for conducting the gases from said connecting means to said dispensing tip, a plurality of valves associated with said passageways for controlling the flow of gas through said passageways, a trigger movably mounted in said body, trip means associated with said trigger for momentarily opening one of said valves to emit a charge of one of the gases upon actuation of said trigger, lever means for opening one of said valves for each gas supplied, the said passageways to the dispensing tip that are associated with the said valves that are actuated by said lever means are joined for mixing the gases before dispensing from said tip, a pair of outlets in said dispensing tip, the first of said outlets for emitting the mixture of gases and the second outlet for emitting the charge of gas released by the valve associated with said trip means, electrical means for igniting that charge of gas within the passageway leading to said second outlet whereby the mixture of gases emitted from the first said outlet is ignited by the charge of ignited gas emitted from said second outlet, and means for operating said electrical means in synchronization with the said emission of a charge of gas for igniting said charge of gas passing through the said passageway leading to said second outlet.

7. In an electrically and externally ignited gas torch for using a mixture of at least two gases supplied separately to the torch under pressure, the combination of: a body having means for connecting to the supply of gases, a gas-dispensing tip mounted on said body, said body having a plurality of passageways for conducting the gases from said connecting means to said dispensing tip, a plurality of valves associated with said passageways for controlling the flow of gas through said passageways, a trigger movably mounted in said body, trip means associated with said trigger for momentarily opening one of said valves to emit a charge of one of the gases upon actuation of said trigger, lever means associated with said trigger for opening one of said valves for each gas supplied upon actuation of said trigger, the said passageways to the dispensing tip that are associated with the said valves that are actuated by said lever means are joined for mixing the gases before dispensing from said tip, a pair of outlets in said dispensing tip, the first of said outlets for emitting the mixture of gases and the second outlet for emitting the charge of gas released by the valve associated with said trip means, an ignition chamber in said passageway extending between said second outlet and said valve associated with said trip means, electrical means for igniting that charge of gas within the said ignition chamber whereby the mixture of gases emitted from the first said outlet is ignited by the charge of ignited gas emitted from said second outlet.

8. The combination of claim 7 wherein said electrical means includes a pair of crystal cells for generating said spark when energized, and means for energizing said crystal cells.

9. The combination of claim 7 wherein said electrical means includes a pair of crystal cells for generating the said spark when energized, and means for urging one of said crystal cells against the other to energize said cells in synchronization with the opening of the said valve to emit the said charge of gas.

10. The combination of claim 7 wherein the said electrical means includes a pair of adjacent crystal cells, a wire leading from between said cells to the said ignition chamber for transmitting the current thereto for causing the spark, and means for urging one of said crystal cells against the other to generate the current in said wire; said means for urging one crystal cell against the other including a plunger movable toward and away from said one crystal cell, biasing means urging said plunger toward said one crystal cell, and means for moving said plunger away from said one crystal cell and releasing said plunger for striking said one crystal cell in a direction toward the said other crystal cell.

11. In an electrically and externally ignited gas torch for using a mixture of at least two gases supplied separately to the torch under pressure, the combination of: a body having means for connecting to the supply of gases, a gas-dispensing tip mounted on said body, said body having a plurality of passageways for conducting the gases from said connecting means to said dispensing tip, a plurality of valves associated with said passageways for controlling the flow of gas through said passageways, a trigger movably mounted in said body, trip means associated with said trigger for momentarily opening one of said valves to emit a charge of one of the gases upon actuation of said trigger, lever means associated with said trigger for opening one of said valves for each gas supplied upon actuation of said trigger, the said passageways to the dispensing tip that are associated with the said valves that are actuated by said lever means are joined for mixing the gases before dispensing from said tip, a pair of outlets in said dispensing tip, the first of said outlets for emitting the mixture of gases and the second outlet for emitting the charge of gas released by the valve associated with said trip means, an ignition chamber in said passageway extending between said second outlet and said valve associated with said trip means, and electrical means for igniting that charge of gas whereby the mixture of gases is ignited at the first said outlet by the charge of ignited gas emitted from second outlet, said electrical means including at least one battery, a coil, a pair of contact points, and means for conducting current among said battery, said coil, and said contact points whereby momentary closing of said contact points causes a spark within said ignition chamber for igniting the said charge of gas.

12. In an electrically and externally ignited gas torch for using a mixture of at least two gases supplied separately to the torch under pressure, the combination of: a body having means for connecting to the supply of gases, a gas-dispensing tip mounted on said body, said body having a plurality of passageways for conducting the gases from said connecting means to said dispensing tip, a plurality of valves associated with said passageways for controlling the flow of gas through said passageways, a trigger movably mounted in said body, means associated with said trigger for momentarily opening one of said valves to emit a charge of one of the gases and for opening one of said valves for each gas supplied upon actuation of said trigger, one of said passageways leading to said dispensing tip for conducting said charge of gas and another of passageways for conducting the gases emitted by all of the other said valves to said dispensing tip and mixing those gases, a pair of outlets in said dispensing tip, the first of said outlets for emitting the mixture of gases and the second outlet for emitting the said charge of gas, electrical means for causing a spark within the said passageway for conducting the said charge of gas for igniting that charge of gas whereby the mixture of gases emitted from the first said outlet is ignited by the charge of ignited gas emitted from said second outlet, and means associated with said trigger and said electrical means for causing the said spark immediately after the momentary opening of said valve to emit said charge of gas whereby the charge of gas so emitted is within said passageway for conducting same at the time the spark is caused.

13. The combination of claim 12 wherein the means associated with said trigger for momentarily opening one of said valves and the means associated with said trigger and said electrical means for causing the spark are comprised of a wheel rotatably mounted on said body, a lever pivotally mounted on said body, a rod extending between said trigger and said lever for causing pivotal movement of said lever upon turning of said trigger, a pawl pivotally mounted on said lever, a pair of pins mounted on said wheel, a trip lever pivotally mounted on said body, a contact lever pivotally mounted on said body and having a contact point for closing an electrical circuit to cause the gas igniting spark, means on said pawl for engaging one of said pins on said wheel to cause turning of said wheel in one direction upon pivotal movement of said lever caused by actuation of said trigger, the other of said pins engaging said trip lever for pivoting same, pivotal movement of said trip lever serving to open said valve for emitting said charge of gas, means for engaging the said pawl upon complete actuation of said trigger for disengaging said pawl from the first said pin on said wheel, means for causing the said wheel to turn in a reverse direction after release by said pawl, the said contact lever being so positioned as to be engaged by and stop the said first pin upon the reverse direction rotation of the wheel, and the said engagement of the first pin with said contact lever causing pivotal movement of said contact lever and said contact point to momentarily close said electrical circuit.

14. The combination of claim 12 wherein the means associated with said trigger for momentarily opening one of said valves and the means associated with said trigger and said electrical means for causing the spark are comprised of a wheel rotatably mounted on said body, a lever pivotally mounted on said body, a rod extending between said trigger and said lever for causing pivotal movement of said lever upon turning of said trigger, a pawl pivotally mounted on said lever, a pair of pins mounted on said wheel, a trip lever pivotally mounted on said body, a contact lever pivotally mounted on said body and having a contact point for closing an electrical circuit to cause the gas igniting spark; means on said pawl for engaging one of said pins on said wheel to cause turning of said wheel in one direction upon pivotal movement of said lever caused by actuation of said trigger, the other of said pins engaging said trip lever for pivoting same, pivotal movement of said trip lever serving to open said valve for emitting said charge of gas, means for engaging the said pawl upon complete actuation of said trigger for disengaging said pawl from the first said pin on said wheel, means for causing the said wheel to turn in a reverse direction after release by said pawl, the said contact lever being so positioned as to be engaged by and stop the said first pin upon the reverse direction rotation of the wheel, and the said engagement of the first pin with said contact lever causing pivotal movement of said contact lever and said contact point to momentarily close said electrical circuit.

15. In an electrically and externally ignited gas torch for using a mixture of at least two gases supplied separately to the torch under pressure, the combination of: a body having means for connecting to the supply of gases, a gas-dispensing tip mounted on said body, said body having a plurality of passageways for conducting the gases from said connecting means to said dispensing tip, a plurality of valves associated with said passageways for controlling the flow of gas through said passageways, a trigger movably mounted in said body, means associated with said trigger for momentarily opening one of said valves to emit a charge of one of the gases and for opening one of said valves for each gas supplied upon actuation of said trigger, one of said passageways leading to said dispensing tip for conducting said charge of gas and another of passageways for conducting the gases emitted by all of the other said valves to said dispensing tip and mixing those gases, a pair of outlets in said dispensing tip, the first of said outlets for emitting the mixture of gases and the second outlet for emitting the said charge of gas, an ignition chamber in said passageway extending between said second outlet and said valve for releasing said charge of gas, electrical means for causing a spark in said ignition chamber for igniting that charge of gas whereby the mixture of gases emitted from the first said outlet is ignited by the charge of ignited gas emitted from said second outlet; said electrical means including at least one battery, a coil, a pair of contact points associated with said trigger, spark means positioned within said ignition chamber and means for conducting current among said battery, said coil, said contact points and said spark means whereby momentary closing of said contact points causes a spark at said spark means; and means associated with said trigger for momentarily closing said contact points immediately after the momentary opening of said valve for emitting the said charge of gas whereby the charge of gas so emitted is within said ignition chamber at the time the spark is caused.

16. In an electrically and externally ignited gas torch for using a mixture of at least two gases supplied separately to the torch under pressure, the combination of: a body having means for connecting to the supply of gases, a gas-dispensing tip mounted on said body, said body having a plurality of passageways for conducting the gases from said connecting means to said dispensing tip, a plurality of valves associated with said passageways for controlling the flow of gas through said passageways, a trigger movably mounted in said body, trip means associated with said trigger for momentarily opening one of said valves to emit a charge of one of the gases upon actuation of said trigger, lever means associated with said trigger for opening one of said valves for each gas supplied upon actuation of said trigger, the said passageways to the dispensing tip that are associated with the said valves that are actuated by said lever means are joined for mixing the gases before dispensing from said tip, a pair of outlets in said dispensing tip, the first of said outlets for emitting the mixture of gases and the second outlet for emitting the charge of gas released by the valve associated with said trip means, an ignition chamber in said passageway extending between said second outlet and said valve associated with said trip means, electrical means for igniting that charge of gas whereby the mixture of gases is ignited at the first said outlet by the charge of ignited gas emitted from said second outlet; said electrical means including at least one battery, a coil, a pair of contact points associated with said trigger, spark means positioned within said ignition chamber and means for conducting current among said battery, said coil, said contact points and said spark means whereby momentary closing of said contact points causes a spark at said spark means; means associated with said trigger for momentarily closing said contact points upon actuation of said trigger, the actuation of said trigger causing the closing of said contact points immediately after the momentary opening of said valve by said trip means whereby the charge of gas so emitted is within said ignition chamber at the time the spark is caused.

17. As a subcombination for use in the body of an electrically and externally ignited torch for momentarily opening one valve to emit a charge of gas and for closing electrical contact points to cause the gas igniting spark; a trigger pivotally mounted on said body, a wheel rotatably mounted on said body, a lever pivotally mounted on said body, a rod extending between said trigger and said lever for causing pivotal movement of said lever upon turning of said trigger, a pawl pivotally mounted on said lever, a pair of pins mounted on said wheel, a trip lever pivotally mounted on said body, a contact lever pivotally mounted on said body and having a contact point for closing an electrical circuit to cause the gas igniting spark, means on said pawl for engaging one of said pins on said wheel to cause turning of said wheel in one direction upon pivotal movement of said lever caused by actuation of said trigger, the other of said pins engaging said trip lever for pivoting same, pivotal movement of said trip lever serving to open said valve for emitting said charge of gas, means for engaging the said pawl upon complete actuation of said trigger for disengaging said pawl from the first said pin on said wheel, means for causing the said wheel to turn in a reverse direction after release by said pawl, the said contact lever being so positioned as to be engaged by and stop the said first pin upon the reverse direction rotation of the wheel, and the said engagement of the first pin with said contact lever causing pivotal movement of said contact lever and said contact point to momentarily close said electrical circuit.

18. As a subcombination for use in the body of an electrically and externally ignited torch for momentarily opening one valve to emit a charge of gas, for simultaneously opening at least two valves to emit gases to a single passageway to form the mixture of gases consumed by the torch, and for closing electrical contact points to cause the gas igniting spark; a trigger pivotally mounted on said body, a wheel rotatably mounted on said body, a lever pivotally mounted on said body, a rod extending between said trigger and said lever for causing pivotal movement of said lever upon turning of said trigger, a pawl pivotally mounted on said lever, a pair of pins mounted on said wheel, a trip lever pivotally mounted on said body, a contact lever pivotally mounted on said body and having a contact point for closing an electrical circuit to cause said pawl for engaging one of said pins in said wheel to cause turning of said wheel in one direction upon pivotal movement of said lever caused by actuation of said trigger, the other of said pins engaging said trip lever for pivoting same, pivotal movement of said trip lever serving to open said valve for emitting said charge of gas, means on said lever for simultaneously opening all of the valves associated with the passageway for conducting the mixture of gases, means for engaging the said pawl upon complete actuation of said trigger for disengaging said pawl from the first said pin on said wheel, means for causing the said wheel to turn in a reverse direction after release by said pawl, the said contact lever being so positioned as to be engaged by and stop the said first pin upon the reverse direction rotation of the wheel, and the said engagement of the first pin with said contact lever causing pivotal movement of said contact lever and said contact point to momentarily close said electrical circuit.

References Cited by the Examiner

UNITED STATES PATENTS

| | | | |
|---|---|---|---|
| 1,625,630 | 4/1927 | Scott | 158—28 |
| 2,095,747 | 10/1937 | Jacobsson | 158—27.4 |
| 2,477,917 | 8/1949 | Wilson | 158—27.4 |
| 2,716,014 | 8/1955 | Dinkelkamp | 251—74 |
| 2,888,066 | 5/1959 | Wilson | 158—27.4 |
| 2,944,204 | 7/1960 | Herbert | 310—8.7 X |

FOREIGN PATENTS

| | | |
|---|---|---|
| 712,803 | 7/1954 | Great Britain. |
| 819,256 | 9/1959 | Great Britain. |

FREDERICK L. MATTESON, JR., *Primary Examiner.*

MEYER PERLIN, JAMES W. WESTHAVER,
*Examiners.*